UNITED STATES PATENT OFFICE.

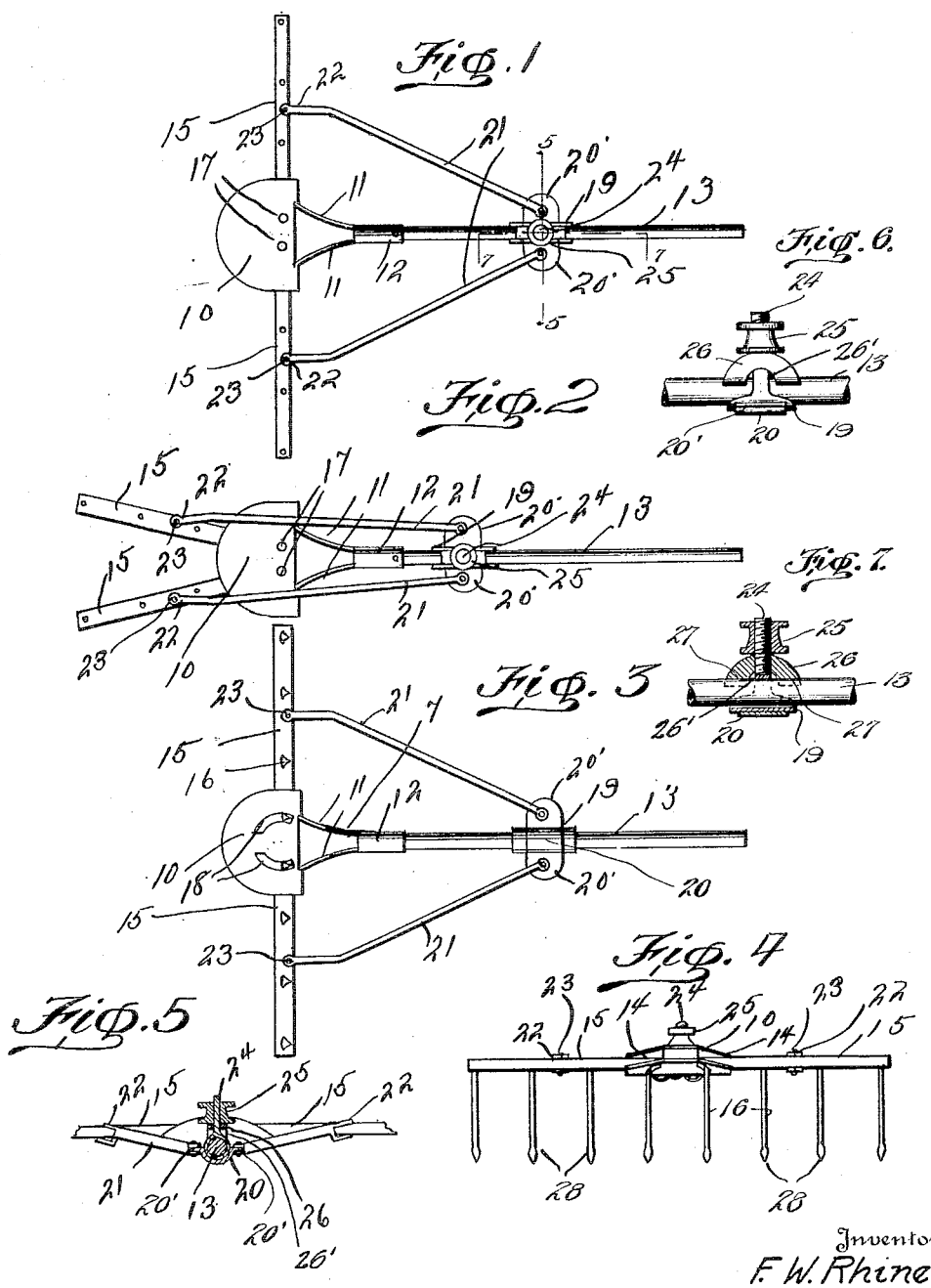

FRANK W. RHINES, OF LAMONT, IOWA.

ADJUSTABLE HAND-RAKE.

1,309,340.  Specification of Letters Patent.  Patented July 8, 1919.

Application filed July 13, 1917.  Serial No. 180,363.

*To all whom it may concern:*

Be it known that I, FRANK W. RHINES, a citizen of the United States, residing at Lamont, in the county of Buchanan, State of Iowa, have invented certain new and useful Improvements in Adjustable Hand-Rakes; and I do hereby declare the following to be a full, clear, and exact description of the invention, such as will enable others skilled in the art to which it appertains to make and use the same.

This invention relates to improvements in garden tools, and particularly to rakes.

One object of the present invention is to provide a novel and efficient device of this character which is capable of quick and easy adjustment for the purpose of widening or narrowing the swath of the rake.

Another object is to provide novel means for moving the adjustable parts of the rake and hold the parts in such adjusted positions.

Other objects and advantages will be apparent from the following description when taken in connection with the accompanying drawing.

In the drawing:

Figure 1 is a top plan view of a rake made in accordance with my invention, the rake being shown in fully extended position.

Fig. 2 is a top plan view of the same showing the rake adjusted to its narrowest position.

Fig. 3 is a bottom plan view of the rake.

Fig. 4 is an end view of the rake.

Fig. 5 is a transverse sectional view taken on the line 5—5 of Fig. 1.

Fig. 6 is an enlarged side elevation of the adjustable device on the handle of the rake.

Fig. 7 is an enlarged vertical longitudinal sectional view taken on the line 7—7 of Fig. 1.

Referring particularly to the accompanying drawing 10 represents a head in the form of a flat casing which is mounted on the outer end of a pair of divergent arms 11 which are carried by a ferrule 12 of the handle 13. In the opposite sides of the casing there are formed the slots 14, and disposed through these slots are the arms 15, each of which has the rake teeth 16 secured thereto. The inner ends of the said arms are pivotally connected to the casing, as shown at 17. In the bottom wall of the casing, and arranged in concentric relation to the pivots 17 are the arcuate slots 18. Through these slots the innermost teeth of the arms 15 are disposed, whereby guides are provided by the coöperation of said teeth with the walls of the said slots 18. Embracing the handle 13, and slidable thereon, is a sleeve 19. Secured to the lower face of the sleeve is a plate 20, and extending horizontally from opposite sides of the plate are wings 20'. Pivotally connected to these wings are the inner ends of a pair of arms 21, the other ends of said arms being bifurcated, as at 22 and disposed in straddling relation to the intermediate portions of the first-mentioned arms 15, pivot pins or bolts 23 being disposed vertically through the said bifurcated ends of the arms 21 and through the arms 15. Extending upwardly from the sleeve is a threaded stem 24, on which is engaged a clamping nut 25, a plate 26 having a longitudinal channel 27 in its under face being engaged on the stem and receiving the handle in said channel. Thus when the nut is screwed down tightly against the said plate 26, this plate will be forced into firm engagement with the handle, and the sleeve held against longitudinal movement on said handle.

It will be noted that the intermediate portion of the plate 26 is formed with an upwardly arched and transverse notch or recess 26', which bridges over or straddles the upper portion of the sleeve 19, thereby permitting the end portions, only, of the plate to rest on the handle 13. The sleeve 19 is of necessity slightly larger in diameter than the handle of the rake, and is also resilient in its nature, so that when the nut is turned downwardly, the plate will be forced against the upper face of the handle, while the sleeve will be drawn upwardly against the lower face, thus firmly clamping the handle shank therebetween, and preventing movement of the arms 15, after such adjustment has been made.

It will thus be seen that when the rake is to be narrowed for the purpose of stirring the soil between rows of plants, especially when said rows are closer together than will admit the rake when out to its fullest extent, the nut is loosened and the sleeve pushed toward the casing, with the result that the arms 15 will be swung forwardly into divergent relation to each other, the degree of the swinging movement of the arms being regulated by the distance of movement of the said sleeve. After the arms 15 have been properly adjusted, the nut is turned down tightly so as to clamp the plate 26 against the handle the said arms 15 will be held against further forward or any backward movement.

The outer ends of the teeth of the rake are flattened and pointed, as well as turned toward the handle, thereby resembling cultivator teeth, as clearly seen at 28.

What is claimed is:

1. An adjustable rake including a head and a pair of teeth carrying arms mounted thereon pivotally, a handle connected to the head, a sleeve slidably disposed on the handle and having an upwardly extending threaded stem, a plate engaged on the stem and bearing on the upper face of the handle, an adjusting nut on the stem and bearing on the plate, and connections between the sleeve and said arms.

2. An adjustable rake including a head, teeth carrying arms pivotally connected to the head, a handle connected to the head, a sleeve slidably disposed on the handle and connected pivotally with the said arms, said sleeve having a vertical threaded stem extending above the handle, a plate having a central and transversely extending recess bridging over the upper portion of the sleeve, the ends of the plate being transversely recessed and receiving the portions of the upper face of the handle longitudinally from the sleeve therein, and a clamping nut engaged on the threaded stem and bearing on the upper portion of the plate to force the same against the upper face of the handle and to draw the sleeve against the lower portion of the handle.

In testimony whereof I affix my signature in the presence of two witnesses.

FRANK W. RHINES.

Witnesses:
F. E. HAWLEY,
FRANK SVOBODA.

Copies of this patent may be obtained for five cents each, by addressing the "Commissioner of Patents, Washington, D. C."